United States Patent
Nagai

(10) Patent No.: US 7,617,107 B2
(45) Date of Patent: Nov. 10, 2009

(54) INFORMATION PROCESSING DEVICE AND INFORMATION PROCESSING PROGRAM

(75) Inventor: Michio Nagai, Akiruno (JP)

(73) Assignee: Olympus Corporation, Tokyo (JP)

( * ) Notice: Subject to any disclaimer, the term of this patent is extended or adjusted under 35 U.S.C. 154(b) by 1135 days.

(21) Appl. No.: 10/678,517

(22) Filed: Oct. 2, 2003

(65) Prior Publication Data

US 2004/0167783 A1   Aug. 26, 2004

(30) Foreign Application Priority Data

Oct. 9, 2002   (JP)   ............................. 2002-296599

(51) Int. Cl.
*G10L 11/00*   (2006.01)
*G06F 3/00*   (2006.01)

(52) U.S. Cl. .................. 704/270; 715/716; 715/731

(58) Field of Classification Search ................ 704/270; 386/52, 54, 328, 55
See application file for complete search history.

(56) References Cited

U.S. PATENT DOCUMENTS

| | | | |
|---|---|---|---|
| 5,262,877 A | 11/1993 | Otsuka | |
| 5,966,122 A | 10/1999 | Itoh | |
| 6,154,601 A * | 11/2000 | Yaegashi et al. | 386/52 |
| 6,282,330 B1 | 8/2001 | Yokota et al. | |
| 6,334,025 B1 * | 12/2001 | Yamagami | 386/96 |
| 6,335,742 B1 | 1/2002 | Takemoto | |
| 6,526,215 B2 | 2/2003 | Hirai et al. | |
| 6,640,044 B2 | 10/2003 | Greenwood et al. | |
| 6,658,527 B1 * | 12/2003 | Hiroyasu | 711/112 |
| 6,674,955 B2 * | 1/2004 | Matsui et al. | 386/52 |
| 6,738,075 B1 * | 5/2004 | Torres et al. | 715/723 |
| 6,774,939 B1 | 8/2004 | Peng | |
| 6,778,760 B1 | 8/2004 | Kagle | |
| 6,928,613 B1 | 8/2005 | Ishii et al. | |
| 6,938,215 B2 * | 8/2005 | Kobayashi et al. | 715/810 |
| 6,976,229 B1 * | 12/2005 | Balabanovic et al. | 715/838 |
| 7,103,842 B2 * | 9/2006 | Masuda et al. | 715/731 |
| 7,239,348 B2 | 7/2007 | Miyazaki | |
| 2001/0008572 A1 * | 7/2001 | Ohmori et al. | 386/52 |

(Continued)

FOREIGN PATENT DOCUMENTS

JP   01-102791 A   4/1989

(Continued)

*Primary Examiner*—David R Hudspeth
*Assistant Examiner*—Brian L Albertalli
(74) *Attorney, Agent, or Firm*—Frishauf, Holtz, Goodman & Chick, P.C.

(57) ABSTRACT

An information processing device is provided for processing audio data linked with predetermined image data in each of positions on a display screen which correspond to a plurality of playback times for the audio data. The device includes a function of displaying a link representing playback-time position information of image data linked with selected audio data, a function of displaying image data not linked with any audio data, on the screen, a function of permitting the user to select desired image data among the image data not linked with any audio data, a function of inserting the selected desired image data in a position which the user desires when the user selects the desired image data, and a function of calculating a playback-time position in the selected audio data corresponding to the position in which the image data is inserted, and linking the selected image data to the calculated position.

8 Claims, 8 Drawing Sheets

U.S. PATENT DOCUMENTS

| | | |
|---|---|---|
| 2001/0033741 A1 | 10/2001 | Miyashita |
| 2002/0033889 A1* | 3/2002 | Miyazaki .................... 348/232 |
| 2002/0036694 A1 | 3/2002 | Merril |
| 2002/0054102 A1* | 5/2002 | Nozaki ....................... 345/764 |
| 2002/0057457 A1 | 5/2002 | Nozaki et al. |
| 2002/0112112 A1 | 8/2002 | Yoshida |
| 2003/0011687 A1 | 1/2003 | Imura et al. |
| 2003/0018777 A1 | 1/2003 | Miller et al. |
| 2003/0055905 A1 | 3/2003 | Nishiyama et al. |
| 2003/0167287 A1 | 9/2003 | Forster |
| 2003/0206723 A1* | 11/2003 | Ando et al. .................. 386/96 |
| 2004/0001631 A1 | 1/2004 | Camara et al. |
| 2004/0027369 A1* | 2/2004 | Kellock et al. .............. 345/716 |
| 2004/0111436 A1 | 6/2004 | Nagai et al. |
| 2004/0143601 A1 | 7/2004 | Shinozaki |

FOREIGN PATENT DOCUMENTS

| | | |
|---|---|---|
| JP | 6-251079 A | 9/1994 |
| JP | 08-077680 A | 3/1996 |
| JP | 09-247607 A | 9/1997 |
| JP | 11-069290 A | 3/1999 |
| JP | 11-215461 A | 8/1999 |
| JP | 2001-069453 A | 3/2001 |
| JP | 2001-218160 A | 8/2001 |

* cited by examiner

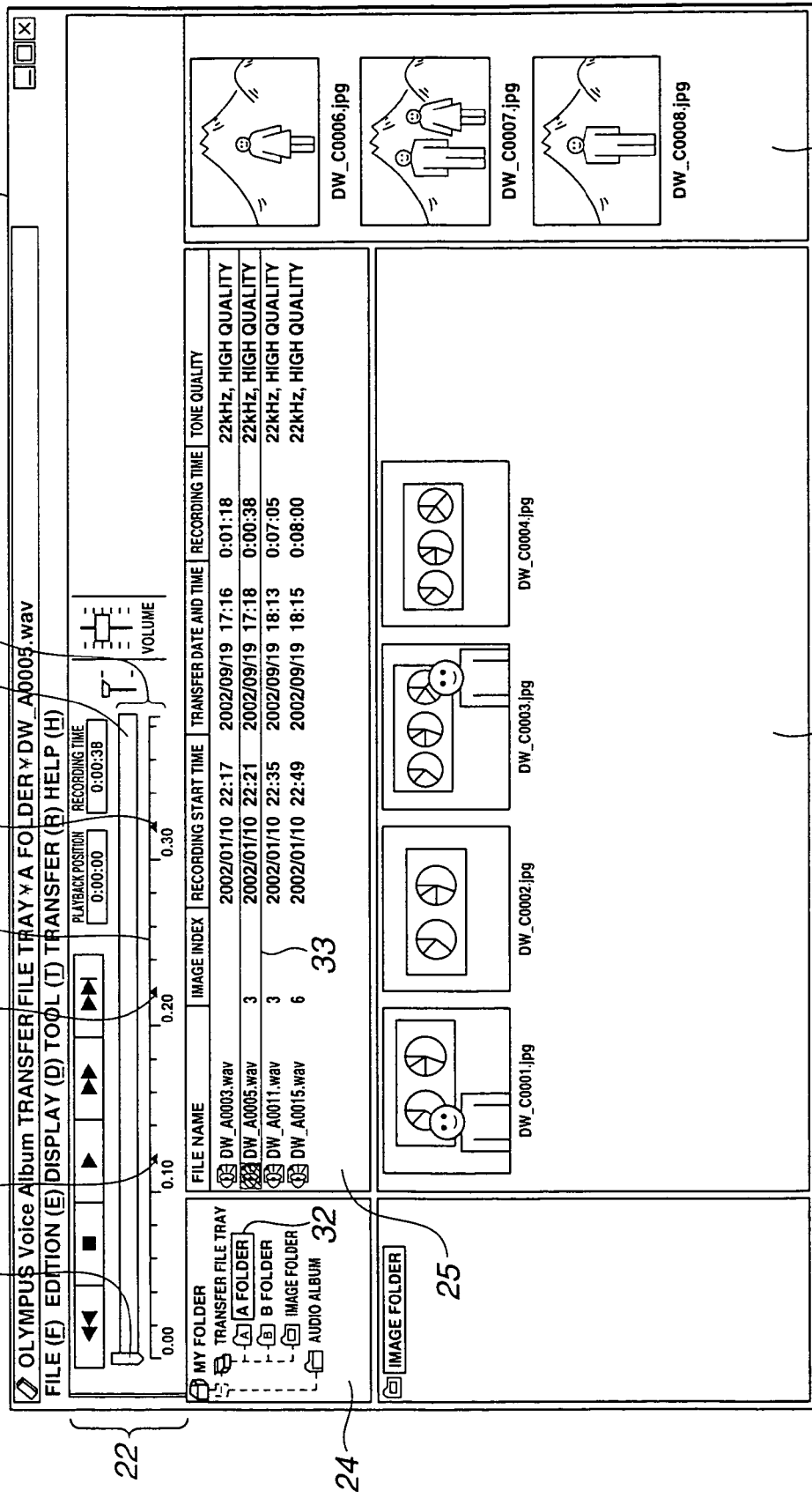

INFORMATION PROCESSING DEVICE AND INFORMATION PROCESSING PROGRAM

CROSS-REFERENCE TO RELATED APPLICATION

This application claims benefits of Japanese Application No. 2002-296599 filed in Japan on Oct. 9, 2002, the entire contents of which are incorporated herein by reference.

BACKGROUND OF THE INVENTION

1. Field of the Invention

The present invention relates to an information processing device and an information processing program and, more particularly, to an information processing device and an information processing program whereby audio data and image data can be linked with each other and processed.

2. Related Art Statement

Conventionally, portable audio recording and playback devices have been put into practical use. According to this kind of device, sound is converted into digital audio data and the data is stored in a rewritable semiconductor memory such as a flash memory, and for playback, the audio digital data is converted into analog data to play back the sound.

On the other hand, camera-attached audio recording and playback devices have also been developed, the devices each having a function for capturing images.

In conventional information processing devices for recording and playing back information such as audio data and image data, when a still picture is desired to be taken during sound recording, picture-taking timing is recorded. Upon sound playback, the still picture captured at that. taking timing is displayed (for example, Japanese Unexamined Patent Application Publication No. 2001-69453 (pp. 1-3, FIG. 1)).

When the user desires to record an image representing a sound recording situation during sound recording, the related art can support the image recording. However, when the user desires to link image data, which has already been formed or which will be formed later, with audio data, the image data cannot be linked with the audio data according to the above-mentioned related art.

BRIEF SUMMARY OF THE INVENTION

In brief, according to the present invention, an information processing device is capable of processing audio data linked with predetermined image data at each of positions on a display screen, the positions corresponding to a plurality of playback times. The apparatus includes: a function of displaying a link information display representing playback-time position information of image data linked with selected audio data, a function of displaying image data, which is not linked with any audio data, on the screen, a function of enabling the user to select desired image data among the image data which are not linked with any audio data, a function of inserting the selected desired image data in a position, which the user desires, in the link information display when the user selects the desired image data, and a function of calculating a playback-time position in the selected audio data corresponding to the position, in which the image data is inserted, in the link information display and linking the selected image data to the calculated position.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE DRAWINGS

FIG. 8 is a diagram showing a typical example of a display screen in the information processing device according to the first embodiment.

DETAILED DESCRIPTION OF THE PREFERRED EMBODIMENTS

Embodiments of the present invention will now be described with reference to the drawings.

Figure 1:
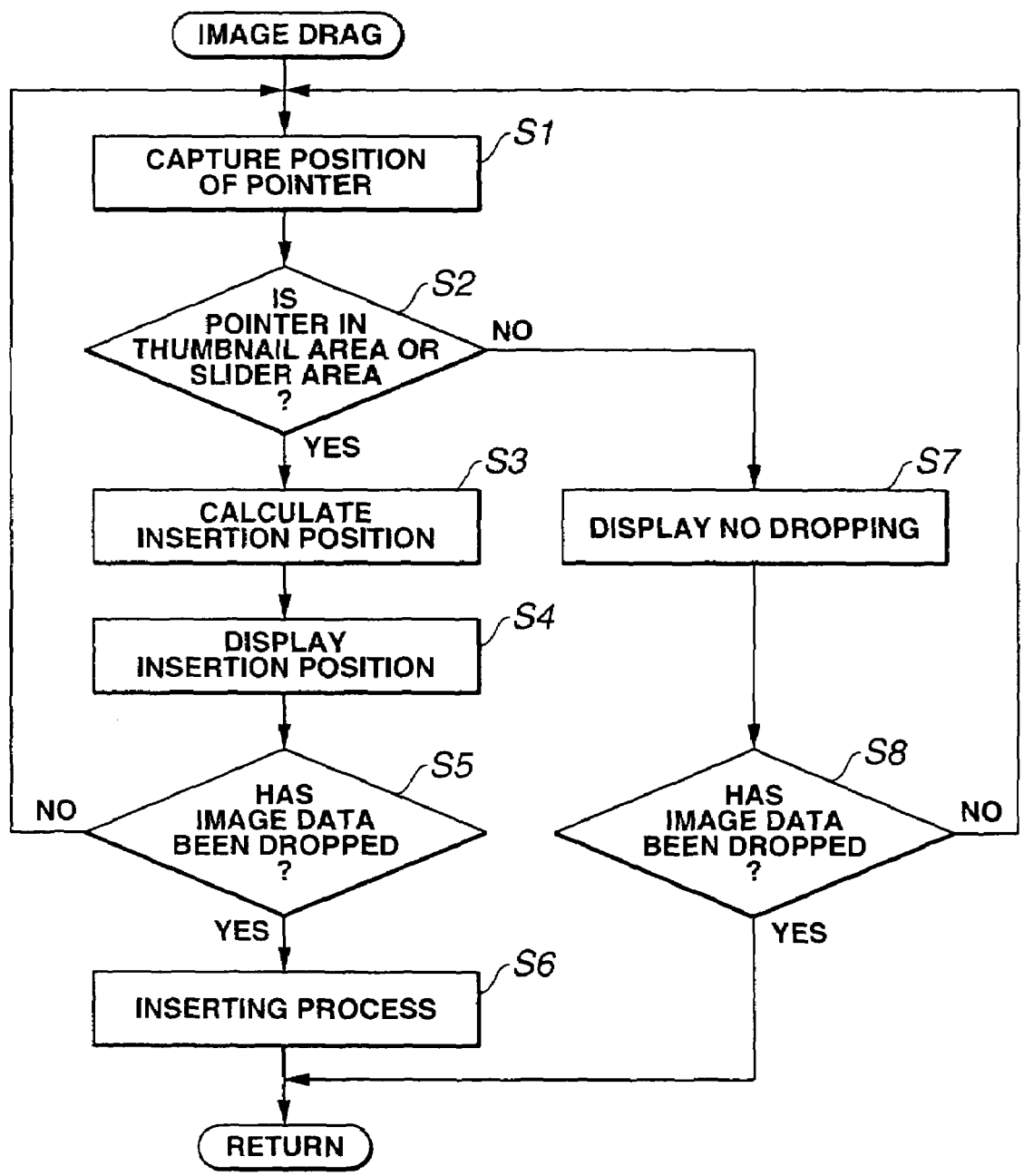
FIG. 1 is a flowchart showing the main operation of an information processing device according to a first embodiment of the present invention.
Figure 2:
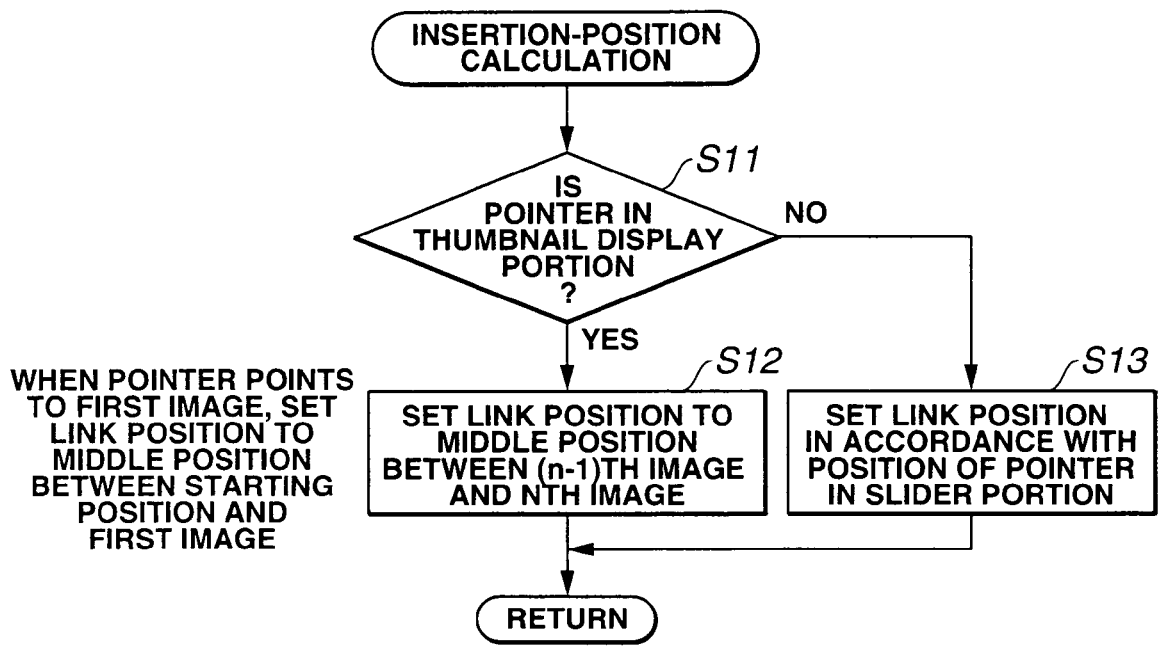
FIG. 2 is a flowchart showing an insertion-position calculating subroutine of the information processing device according to the first embodiment.
Figure 3:
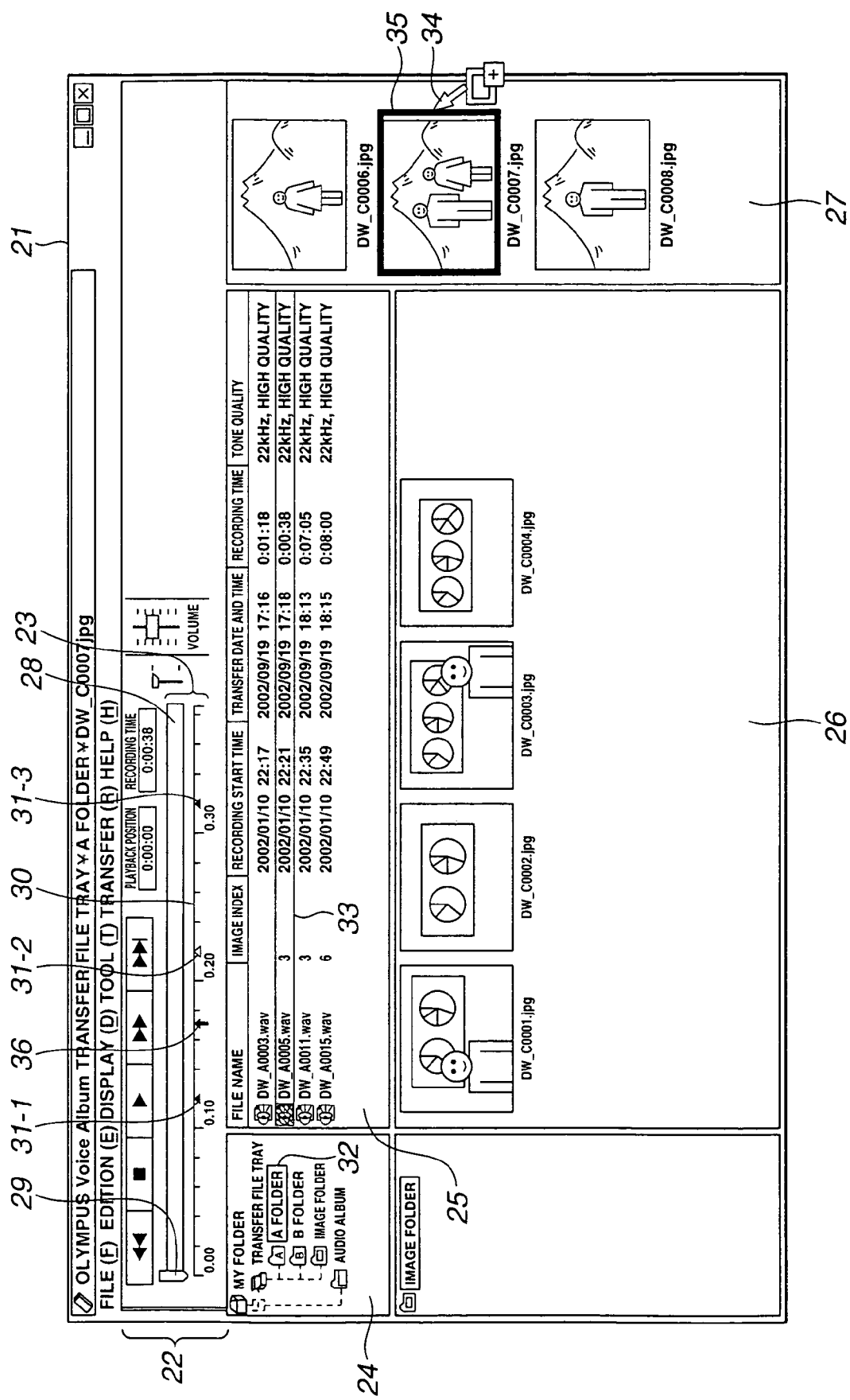
FIG. 3 is a diagram showing an example of an operation screen in the information processing device according to the first embodiment.
Figure 4:
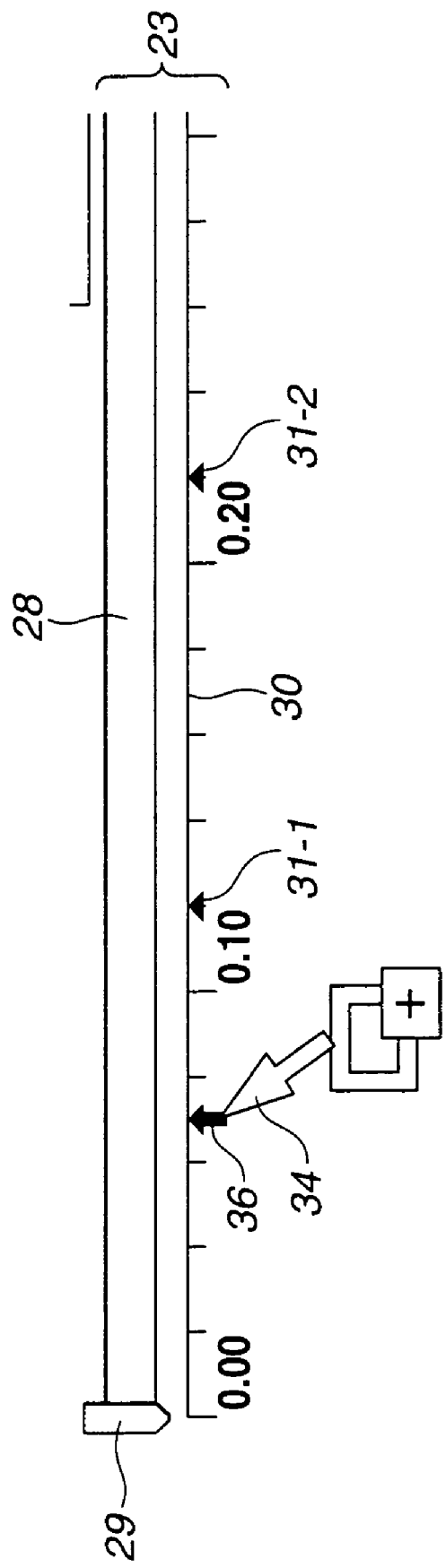
FIG. 4 is a diagram showing another example of the operation screen in the information processing device according to the first embodiment.
Figure 5:
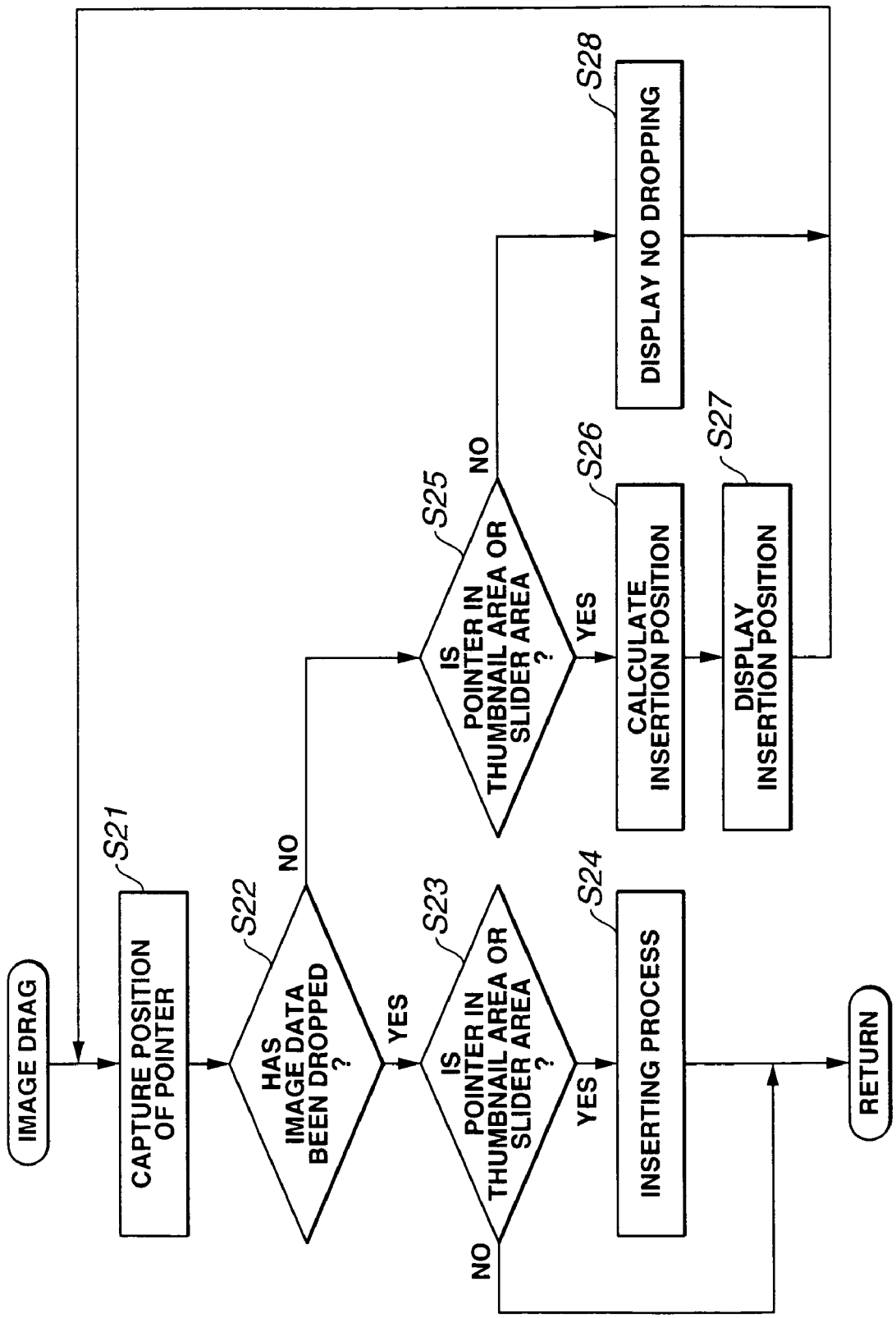
FIG. 5 is a flowchart showing the main operation of an information processing device according to a second embodiment of the present invention.

FIG. 1 is a flowchart showing the main operation of an information processing device according to a first embodiment of the present invention. FIG. 2 is a flowchart showing an insertion-position calculating subroutine of the information processing device according to the first embodiment. FIG. 3 is a diagram showing an example of an operation screen in the information processing device according to the first embodiment. FIG. 4 is a diagram showing another example of the operation screen in the information processing device according to the first embodiment. Further, FIG. 5 is a flowchart showing the main operation of an information processing device according to a second embodiment of the present invention.

Prior to the description of the operation of the information processing device, the operation mostly characterizing the present invention, the connection between a personal computer serving as the information processing device, in which an information processing program is stored, according to the first embodiment of the present invention and an audio recording and playback device (hereinbelow, referred to as a recorder) having an image pickup function, the schematic structure of the recorder, the structure of an audio file to which an image file is linked, and typical examples of an application screen of the personal computer will now be described with reference to FIGS. 6 to 8.

Figure 6:
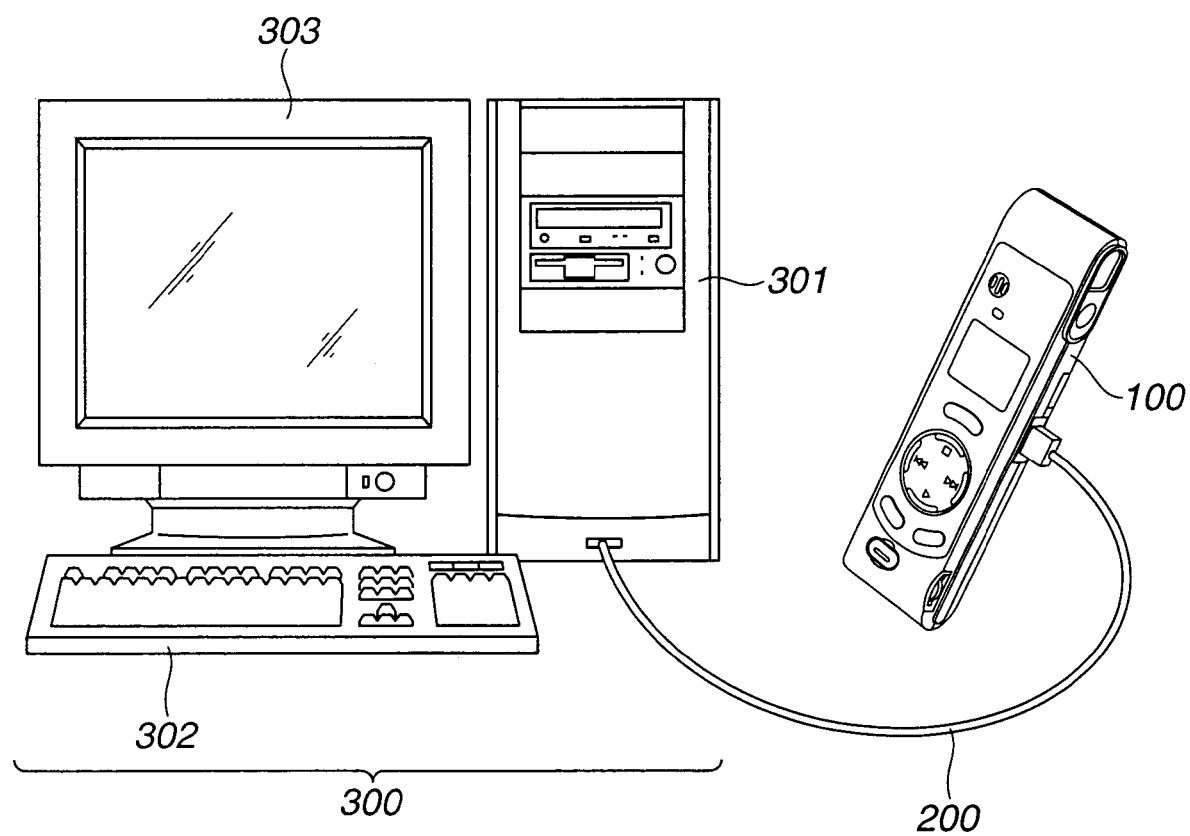
FIG. 6 is a diagram showing the connection between the information processing device according to the first embodiment and a recorder.

FIG. 6 is a diagram showing the connection between the information processing device according to the first embodiment and the recorder.

Referring to FIG. 6, a camera-attached recorder 100 having an image pickup function is connected to a personal computer 300 through a USB cable 200.

The recorder 100 comprises at least: an audio input device such as a microphone; an audio output device such as a speaker; an image pickup device such as a CCD; a storage device such as a rewritable semiconductor memory (for example, a flash memory); a display such as a liquid crystal panel; a USB port serving as an input/output terminal; and an operation unit having various operation buttons. The recorder 100 is driven by a battery serving as a power source. When the USB cable 200 is removed, the recorder 100 is portable. The recorder 100 is capable of capturing an audio signal and an image signal, or either the audio signal or the image signal using the built-in microphone and image pickup device and storing the signal in the built-in rewritable storage device.

The personal computer 300 comprises: a personal computer body 301; an input device 302 including a keyboard and a mouse (not shown); and an output device 303 including a display unit such as a liquid crystal display or a CRT display and an audio output unit such as a speaker (not shown).

The personal computer body 301 includes at least: a main memory; an auxiliary memory such as a hard disk drive in which a basic program, an application program, and various data are stored; a CPU constituting a central processing unit for performing various processes such as a basic process and an application process using the various programs and data read from the main memory; and various input/output interfaces and input/output terminals (including the USB port). Further, the personal computer body 301 has playback means (including image processing of the CPU) for playing back image data as a video signal which can be displayed on the display and playback means (including audio playback processing of the CPU) for playing back audio data as an audio frequency signal which can be played back through the speaker.

An application program, whereby audio data and image data can be downloaded from the recorder 100 and be then edited, has been installed in the personal computer 300. In other words, the personal computer 300 functions as an information processing device capable of capturing audio data and image data from the recorder 100 and editing the data.

To supply audio data and image data from the recorder 100 to the personal computer 300, and the personal computer 300 and the recorder 100 are connected mutually through the USB cable 200, the application program in the personal computer 300 is started, and an operation button for download on the application is clicked using the mouse (not shown), so that audio data and/or image data stored in the recorder 100 can be easily transferred to the personal computer 300.

Figure 7:
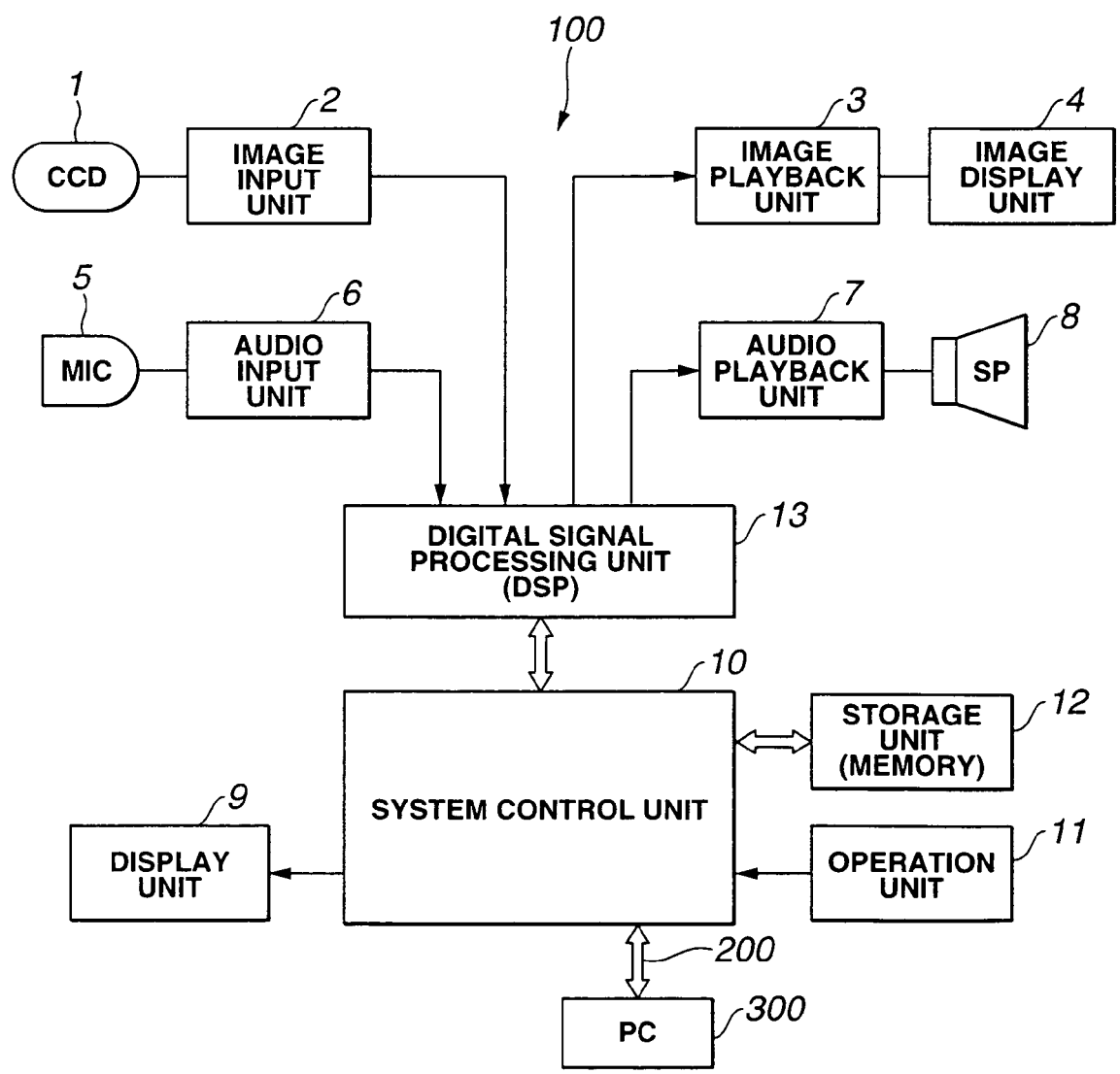
FIG. 7 is a block diagram concretely showing the structure of the recorder corresponding to the information processing device according to the first embodiment.

FIG. 7 is a block diagram concretely showing the structure of the recorder according to the present embodiment.

Referring to FIG. 7, an output terminal of a microphone (abbreviated to an MIC) 5 for converting sound to an electric signal is connected to an input terminal of an audio input unit 6. An output terminal of the audio input unit 6 is connected to an input terminal of a digital signal processing unit (abbreviated to a DSP) 13.

Further, an output terminal of the digital signal processing unit 13 is connected to an input terminal of an audio playback unit 7. An output terminal of the audio playback unit 7 is connected to an input terminal of a speaker (abbreviated to an SP) 8.

Similarly, an output terminal of an image pickup device (abbreviated to a CCD) 1 for converting an image into an electric signal is connected to an input terminal of an image input unit 2. An output terminal of the image input unit 2 is connected to the input terminal of the digital signal processing unit 13.

Further, the output terminal of the digital signal processing unit 13 is connected to an input terminal of an image playback unit 3. An output terminal of the image playback unit 3 is connected to an input terminal of an image display unit 4 comprising, for example, a TFT type LCD.

The image playback unit 3 comprises a video control circuit and a D/A converter (both of which are not shown). In the image playback unit 3, a supplied digital signal is converted into an analog signal. The image display unit 4 has a display function of playing back and displaying image data selected by selecting means (not shown) and displaying attribute information of audio data or image data selected by data selecting means (not shown).

The image playback unit 3 and the image display unit 4 can be omitted (removed). In other words, when the image playback unit 3 and the image display unit 4 are not provided, so long as a file including audio data and image data is transferred to the personal computer 300, the image data can be played back and displayed on an application displayed on the display 303 of the personal computer 300 and the attribute information of the audio data or image data can be displayed thereon.

The audio input unit 6 comprises: a microphone amplifier for amplifying an electric signal supplied from the microphone 5; a low-pass filter for cutting an unnecessary frequency band; and an A/D converter for converting an input audio signal (analog signal) into a digital signal (which are not shown in the diagram).

The audio playback unit 7 comprises: a D/A converter for converting a digital signal supplied from the digital signal processing unit 13 into an analog signal; a low-pass filter for cutting an unnecessary frequency band; and a power amplifier for amplifying an audio signal (which are not shown in the diagram). The audio playback unit 7 has an audio playback function of playing back audio data selected or designated by selecting means (not shown).

The image input unit 2 comprises respective circuits for controlling iris, gain, white balance and the like, and an A/D converter (which are not shown in the diagram). The image input unit 2 converts various pixel signals supplied from the image pickup device 1 into digital signals.

The digital signal processing unit 13 is controlled by a system control unit 10, which will be described later. Upon sound recording, the digital signal processing unit 13 encodes (compresses) the audio and image digital signals to audio data and image data in the respective predetermined encoding formats every frame. The encoded data is temporarily stored in a buffer memory (not shown) of the system control unit 10. Upon playback, the digital signal processing unit 13 decodes (decompresses) audio data and image data from the buffer memory every frame.

The digital signal processing unit 13 is connected to the system control unit 10. In addition to the digital signal processing unit 13, a storage unit (memory) 12, an operation unit 11, and a display unit 9 are connected to the system control unit 10.

The system control unit 10 comprises a CPU and the like to control the whole of the present device.

The storage unit (memory) 12 comprises a nonvolatile semiconductor memory such as a flash memory. The storage unit 12 has a storage function having an audio storage area in which audio data is stored and an image storage area in which image data is stored, and also the storage unit 12 has an audio folder to store a plurality of audio data and an image folder to store a plurality of image data. Upon sound recording, the storage unit 12 stores audio data and/or image data, encoded by the digital signal processing unit 13, through the buffer memory (not shown) of the system control unit 10. At this time, the storage unit 12 also stores link information (namely, index information) indicating the relation between audio data and image data. The index information is used as follows: In a process of continuously recording audio data for a predetermined time, when still image data is captured by pressing a shutter button during sound recording for the predetermined period to perform the photographing operation of the image pickup device 1 properly (namely, when photographing is needed), and is stored into the storage unit 12; the index information indicates a time position (timing) at which the image data is inserted into the audio data in order to store the image data so as to be linked with the audio data which is being recorded. The information will be described later with reference to Table 1.

The operation unit 11 includes operation buttons for controlling various functions. The operation unit 11 comprises a sound recording button (REC), a menu/folder (MENU/FOLDER) button, a shutter button, a hold button (HOLD), an erasing button (ERASE), and a multi-function button [a playback button/determination button (PLAY/DETERMINATION), a stop button (STOP), a fast-forward/+selection button (FF/SELECTION), a fast-rewind/−selection button (REW/SELECTION)]. The respective buttons, constituting the multi-function button, can be separately arranged.

The menu/folder (MENU/FOLDER) button is pressed several times to display an audio folder or an image folder on the display unit 9 and then the sound recording button (REC) is pressed. Thus, the sound recording operation can be started. Further, when the shutter button is pressed in the sound recording state, an image serving as an index related to the sound can be photographed. Alternatively, the image folder is displayed on the display unit 9 using the menu/folder (MENU/FOLDER) button and, after that, the shutter button is pressed without pressing the sound recording button (REC), thus capturing an image, which is not related to sound, through a digital camera (namely, digital camera photography). Further, the menu/folder (MENU/FOLDER) button is pressed for a predetermined time or longer to display a menu screen on the display unit 9 and, after that, the ±selection buttons are operated, thus realizing various settings (for example, time setting).

The display unit 9 displays an operation mode indicated when a predetermined sequence operation is started by operating any button of the operation unit 11, or displays a situation of the subsequent operation. For example, when the sound recording button (REC) is pressed, the display unit 9 displays a file number, a recording elapsed time, and a recordable remaining time. When the menu/folder (MENU/FOLDER) button is pressed, the display unit 9 displays information related to the selection of functions, for example, the sensitivity of the microphone (high/low), a recording mode (standard/long), and an alarm (on/off). Further, when the system control unit 10 has a clock function, the display unit 9 displays the current date and time. The above display contents may also be displayed on the image display unit 4.

In the case where image data as an index is linked with audio data, when information indicating which image data as an index is linked with audio data at what time indicating a lapse of time (minutes and seconds) from the sound recording start time is used in linking, the information is formed by any of the following methods. According to the first method, another file different from that of audio data, for example, a file of table data is formed. According to the second method, header information indicating which image is linked with audio data and which position in the audio data is the image linked to is provided at a header portion of an audio file. If such header information is used, the personal computer uses a method for reading the header information, analyzing the link, and reproducing the link relation by an application using the analysis result.

Table 1 shows an example of an audio file formed at the recorder.

TABLE 1

| | Address | Detail | Size | Format |
|---|---|---|---|---|
| Audio file | | | | |
| Header { | 0-5 | Sound recording start date and time | 6 | ASCII |
| | 6 | Sound recording rate | 1 | Binary |
| | 7 | Number of links | 1 | Binary |
| | 8-262 | File name | 255 | ASCII |
| | 263-266 | Link Time | 4 | Binary |
| | . . . | (49 sets of "File name" & "Link time") | | |
| | | Audio data | | |

Table 1 shows the structure of one audio file comprising a header and audio data. The header includes: recording start date and time of audio data formed on the basis of time data measured by clock means (not shown) in the recorder 100; a sound recording rate indicating an SP (standard play) mode or an LP (long play) mode; the number of links of image indexes related to audio data (namely, the number of image indexes); an image file name of image data as an index related to audio data; and link time indicating at which time position (how much time has elapsed after the recording start time of audio data) the image file is linked to the audio data. In the header, for example, 50 sets each comprising an image file name and link time can be set in total.

After the 50 sets of data, audio data serving as main data is arranged. The 50 sets of data and audio data constitute one audio file. For each detail data (detail) such as the recording start date and time, the sound recording rate, the number of links, the image file name, and the link time provided in one audio file, address information (address), size information (size), and format information (format) are provided as attribute information as shown in Table 1. The address information (address) indicates an address from the head of the audio file in the storage unit 12, in which the address data is stored. The size information (size) indicates the amount of data stored in bytes. The format information (format) indicates an ASCII format or a binary format.

Table 1 shows the structure of one audio file constituting a set of audio data. At least one image data (image data provided as the image file name) linked to the audio data is stored in another image storage area so that the image data is included in an image file different from the audio file. Table 1 shows the structure of one audio file. Each time sound recording is newly performed (namely, at another time), another audio file having header information with the above-mentioned structure is formed. The formed audio files are stored as different files in the same audio storage area.

For image data captured during sound recording, a flag as information indicating the presence or absence of link is set at the header of a file including the image data. Further, a link destination folder, a link-destination audio file No., and link-time position information are written in the file header. Information indicating the presence or absence of link is not written in image data captured when sound recording is not performed.

In referring to an audio file, an image, which is linked to the audio file and is stored in the same folder of the audio file, is accessed using link information (the linked image file name and link-time position) included in the header of the audio file, so that a thumbnail image can be displayed. In referring to an image folder, whether an image is linked to sound can be determined using information indicating the presence or absence of link.

FIG. 8 shows a typical example of a display screen in the information processing device according to the first embodiment of the present invention.

Referring to FIG. 8, the screen is in a state in which an application program to download audio data and image data from the recorder and edit the data is started. An operation screen 21 comprises: a menu bar including File, Editing, Display, Tool, Transfer, and Help; an audio data operation portion 22 including various buttons such as Playback, Stop, Fast-feed, and Fast-rewind and an audio data slider portion 23; a folder display portion 24; an audio data display portion 25; an image folder display portion 26; and a thumbnail display portion 27.

The audio data slider portion 23 comprises: a display mark 29 indicating a position (which is represented by a tab and will be simply referred to as a playback position) corresponding to playback time on the display screen; a slider 28 to move the display mark 29 indicating the playback position along a time base 30; the time base 30 arranged in the longitudinal direction of the slider; and one or more index marks (for example, 31-1, 31-2, and 31-3) indicating that image data related to audio data exists on the time base 30 (namely, each index mark indicating an image index position).

The audio data slider portion 23 functions as display means for displaying an image index position constituting a playback position in audio data with which image data is linked. In other words, the audio data slider portion 23 comprises position information display means having a display area in which playback position information of image data linked with selected audio data is displayed. Moreover, the index marks (for example, 31-1, 31-2, and 31-3) can be properly moved and set on the time base 30.

In the folder display portion 24, a transfer file tray to store audio data and image data transferred to the personal computer 300 is provided. The transfer file tray has A and B folders to store audio data and an image folder to store image data.

The audio data display portion 25 displays a list of audio data (only audio data which can be played back) in the folder (for instance, an A folder 32) selected in the folder display portion 24 on the left of the screen. Second audio data 33 from top is being selected. In this selection state, a plurality of (in the diagram, three) image data (indexes), linked with the audio data included in audio data 33 are displayed as thumbnail images together with respective file names in the thumbnail display portion 27 on the right of the screen.

In the thumbnail display portion 27, the three thumbnail images are vertically displayed in time-base arrangement order (in playback order). Therefore, the thumbnail display portion 27 comprises position information display means having a display area in which playback position information of image data linked with selected audio data is displayed.

In the image folder display portion 26, image data, which is stored in the image folder of the folder display portion 24 and is formed by digital camera photography, is displayed as a thumbnail image (or the detail of image data is displayed). Therefore, the image folder display portion 26 comprises image data display means for displaying image data which is not linked with audio data.

In the state shown in FIG. 8, for example, the A folder 32 is selected in the folder display portion 24 to display a list of audio files in the audio data display portion 25 (in the diagram, four audio files are displayed), and the audio file 33 (this file is DW_A0005.wav) which is the second one from top is selected among the four audio files displayed in the list.

In this state, the audio file 33 is selected and, simultaneously, a plurality of image data (three image data having file names of DW_C0006.jpg, DW_C0007.jpg, and DW_C0008.jpg in the diagram) related to the selected audio file 33 (DW_A0005.wav) are displayed in the thumbnail display portion 27. Further, the image folder display portion 26 is displayed under the audio data display portion 25. In the image folder display portion 26, a plurality of image files (four image files having file names of DW_C0001.jpg, DW_C0002.jpg, DW_C0003.jpg, and DW_C0004.jpg in the diagram), which are stored in the image folder and are not related to audio data, are displayed, the images being captured by digital camera photography.

In the image folder display portion 26, the four image files DW_C0001.jpg, DW_C0002.jpg, DW_C0003.jpg, and DW_C0004.jpg are displayed in a thumbnail (scale-down image) display format in list form. When the menu bar is clicked in this order of "Display" →"Detail display", the image files can be displayed in the same file list form as that shown in the audio data display portion 25. At that time, the file names DW_C0001.jpg, DW_C0002.jpg, DW_C0003.jpg, and DW_C0004.jpg are displayed such that one file is displayed in each line. In the list, subsequent to each file name, the file size and photographing date and time are displayed with an icon and a text format.

The three index marks 31-1, 31-2, and 31-3 are displayed in the time base 30. In the normal state (in non-selection mode), each mark is displayed with, for example, red. The three index marks 31-1, 31-2, and 31-3 correspond to the three thumbnail images DW_C0006.jpg, DW_C0007.jpg, and DW_C0008.jpg) displayed in the thumbnail display portion 27, respectively. This means that image data DW_C0006.jpg, DW_C0007.jpg, and DW_C0008.jpg, displayed in the thumbnail display portion 27, exist at respective time positions shown by the index marks 31-1, 31-2, and 31-3 on the time base 30, each index mark corresponding to sound recording time in the audio file 33.

The operation according to the first embodiment of the present invention will now be described.

FIG. 1 is a flowchart showing the main operation of the information processing device according to the first embodiment of the present invention. FIG. 2 is a flowchart showing an insertion-position calculating subroutine of the information processing device according to the first embodiment. FIG. 3 is a diagram showing an example of an operation screen in the information processing device according to the first embodiment. FIG. 4 is a diagram showing another example of the operation screen in the information processing device according to the first embodiment. Further, FIG. 5 is a flowchart showing the main operation of an information processing device according to a second embodiment of the present invention.

A display screen of the personal computer will now be described with reference to FIGS. 3 and 4.

The display screen, shown in FIG. 3, in the personal computer is substantially the same as that shown in FIG. 8. FIG. 3 shows a state in which an image-index adding operation serving as the characteristics of the present invention is performed in the screen before operation in FIG. 8.

An image file (for example, DW_C0003.jpg) is selected among a plurality of (in the diagram, four) image files in the image folder display portion 26 using a mouse pointer 34. After that, the selected image file DW_C0003.jpg is pointed with the pointer 34, the left button of the mouse is pressed, and the pointer is then moved while the left button is being pressed (in other words, the image file is dragged). Then, the pressed left button of the mouse is released over, for example, on the image data DW_C0007.jpg in the thumbnail display portion 27 (in other words, the image file is dropped). Thus, the image file DW_C0003.jpg can be linked to the middle position between the image data DW_C0006.jpg and DW_C0007.jpg (namely, a position shown by an arrow 36 corresponding to the intermediate position between the index marks 31-1 and 31-2 in the time base 30 in the audio data slider portion 23)

After the image file DW_C0003.jpg is linked with the audio file, the arrow 36 in the time base 30 is changed to a mark Δ indicating a new index mark. In the thumbnail display portion 27, the linked image DW_C0003.jpg is added between the image data DW_C0006.jpg and DW_C0007.jpg.

In the state actually illustrated in FIG. 3, the image file DW_C0003.jpg is dragged and the pointer 34 is moved over the thumbnail image DW_C0007.jpg (namely, the state is before dropping). In this state, a thick frame 35 is displayed so as to surround the thumbnail image DW_C0007.jpg. Simultaneously, the arrow 36 indicating a position in which the image is to be inserted is displayed in the middle position between the index marks 31-1 and 31-2 in the time base 30 of the audio data slider portion 23. The color of the index mark 31-2 corresponding to the selected thumbnail image DW_C0007.jpg is changed from the normal color (red in FIG. 8) to green. After that, the image file is dropped, thus adding the linked image.

In FIG. 3, the image to be linked is dragged using the pointer 34 from the images displayed in the image folder display portion 26 and is then dropped in the area serving as the thumbnail display portion 27, thus adding the image. According to another embodiment, an image to be linked is dragged with the pointer 34 and is then dropped in the area serving as the audio data slider portion 23. Thus, the image can be added.

FIG. 4 shows another operation example different from that in FIG. 3. In FIG. 4, the screen before operation is the same as that shown in FIG. 8. FIG. 4 shows only the portion to be operated in the audio data slider portion 23 in FIG. 8.

One image file (for example, DW_C0003.jpg) is selected among a plurality of (in the diagram, four) image files in the image folder display portion 26 using the mouse pointer 34. The selected image file DW_C0003.jpg is pointed with the pointer 34, the left button of the mouse is pressed, and the pointer is then moved while the left button is being pressed (in other words, the image file is dragged). After that, the image file is dropped at a time position before the index mark 31-1 in the time base 30 of the audio data slider portion 23. Thus, the image file DW_C0003.jpg can be linked with the time position shown by the arrow 36 between the recording start point and the index mark 31-1 in the selected audio file.

After the image file DW_C0003.jpg is linked to that position, the arrow 36 in the time base 30 is changed to a mark Δ serving as a new index mark. In the thumbnail display portion 27, the linked image DW_C0003.jpg is added above (before) the image data DW_C0006.jpg.

In the state actually illustrated in FIG. 4, the image file DW_C0003.jpg is dragged and the pointer 34 is moved in the time base 30 of the audio data slider portion 23 (in other words, this state is before dropping) In this state, the arrow 36 indicating a position in which the image is to be inserted is displayed in substantially the intermediate position between the recording start point and the index mark 31-1 in the time base 30. After that, the image file is dropped, thus adding the linked image.

The image index adding operation serving as the characteristics of the present invention will now be described with reference to FIGS. 1 and 2.

First, as shown in FIG. 3, one image file (for example, DW_C0003.jpg) of the image folder display portion 26 is selected by operating the mouse (not shown). After the image file is dragged with the pointer 30, the operation of the flowchart in FIG. 1 (the image-file drag and drop operation) is started.

In step S1, a position of the pointer 34 in the dragging state is captured on the screen. In step S2, whether the pointer 34 in the dragging state is in a thumbnail display area or an audio data slider area on the screen is determined.

In step S2, if the position of the pointer 34 is neither in the thumbnail display area nor in the audio data slider area, an inhibition mark indicating no dropping is displayed on the screen (step S7). Whether the image data has been dropped is determined (step S8). If the image file is not dropped, the operation is returned to step S1. If the image file has been dropped, the operation is returned to the main routine.

If the pointer 34 is in the thumbnail display area or in the audio data slider area in step S2, as shown in step S3, an insertion position of the image to be linked in the recording time base of the selected audio file 33 (for example, the file DW_A0005.wav) is calculated on the basis of the position of the pointer 34 (step S3). The insertion position is displayed using the arrow 36 (step S4).

Subsequently, in step S5, whether the image file has been dropped at the current insertion position is determined. If the image file is not dropped, the operation is returned to step S1. Steps S1 to S5 are repeated until the left button of the mouse is released. Steps S1 to S5 constitute insertion means which selects a desired image data among image data which are not linked with audio data and then inserts the desired image data into a display area to display playback position information. If the image file has been dropped in step S5, the operation proceeds to an inserting process in step S6.

In the inserting process of step S6, the header of the target audio file is rewritten (in other words, link information is added to the header, thus linking the image data with the audio data) and the image file to be linked is moved from the image folder to the audio data folder (for example, the A folder including the audio file with which the image file is linked). The display in the thumbnail display portion 27 and that in the audio data slider portion 23 are updated. Step S6 includes link means for linking the selected image data to the playback position of the selected audio data, the playback position corresponding to the position in the playback position information display area (the thumbnail display area or the audio data slider area) in which the image data is inserted.

FIG. 2 is a flowchart showing the insertion-position calculating process in step S3 mentioned above. Referring to FIG. 2, in step S11, whether the pointer is in the thumbnail display area is determined.

In step S11, if the pointer 34 is in the thumbnail display area, namely, if the pointer 34 points to the nth thumbnail image from top (in other words, in time-base arrangement order) among the thumbnail images displayed in the thumbnail display portion 27, a link position is set to the middle position between the (n−1)th image and the nth image (step S12). Then, the operation is returned to the routine of FIG. 1.

If the pointer 34 points to the first image, the link position is set to the middle position between the starting position of the audio data and the link position of the first image.

In step S11, if the pointer 34 is not in the thumbnail display area, the link position is set in accordance with the position of the pointer 34 in the audio data slider portion 23 (step S13). Then, the operation is returned to the routine of FIG. 1.

FIG. 5 is a flowchart showing the main operation of the information processing device according to the second embodiment.

The structure of the information processing device according to the second embodiment is the same as that according to the first embodiment. The second embodiment is characterized in that the sequence of the step of determining whether the image data has been dropped and the step of determining whether the pointer is in the thumbnail display area or the audio data slider area according to the first embodiment is changed in the operation. According to the same descriptions in steps S21 to S28 as those in steps S1 to S8 in FIG. 1, the same actions are produced. Accordingly, the detailed description thereof is omitted. In other words, a set of steps S21 and S1 produce the same action. The same applies to the respective sets of steps S22, S5, and S8, steps S23, S25, and S2, steps S24 and S6, steps S26 and S3, steps S27 and S4, and steps S28 and S7.

According to the above-mentioned embodiments of the present invention, image data to be inserted is dragged and dropped from the image folder display portion to the thumbnail display area in which image data is arranged in the playback order (in time-base arrangement order), so that the image data is linked to a proper position of audio data in accordance with the position, in the thumbnail display area, where the image data has been dropped. Alternatively, image data to be inserted is dragged and dropped from the image folder display portion to the time base in the audio data slider area, so that the image data is linked to a proper position of audio data in accordance with the position, in the slider area, where the image data has been dropped.

According to the above-mentioned embodiments, when the user desires to link image data, which has already been formed, or image data, which will be photographed (or formed), with audio data recorded, the user can easily link the image data to a proper position of the audio data by the drag and drop operation with the pointer and also can use the image data as an index.

As mentioned above, the present invention can realize an information processing device and program, whereby image data can be linked to a proper time position of audio data with simple operation.

In this invention, it is apparent that working modes different in a wide range can be formed on this basis of this invention without departing from the spirit and scope of the invention. This invention is not restricted by any specific embodiment except being limited by the appended claims.

What is claimed is:

1. An information processing device capable of processing audio data linked with still image data, the apparatus comprising:
   display means for displaying, in a single window on a display screen: (i) a playback-time information display area to display, as a time line, playback-time positions of items of still image data linked with selected audio data, (ii) a first image display area for displaying all of the items of still image data linked with the selected audio data in a playback order of the items of still image data, and (iii) a second image display area for displaying still image data which is not linked with any audio data;
   insertion means for selecting a desired item of still image data from among the still image data displayed in the second image display area, and inserting the selected item of still image data in one of the first image display area and the playback-time information display area; and
   link means for linking the selected item of still image data to a first playback-time position of the selected audio data when the selected item of still image data is inserted in the first image display area, and for linking the selected item of still image data to a second playback-time position of the selected audio data when the selected item of still image data is inserted in the playback-time information display area,
   wherein the first playback-time position is calculated from a position at which the selected item of still image data is inserted among the items of still image data in the first image display area, and the second playback-time position is specified with a pointer on the time line in the playback-time information display area when the selected item of still image data is inserted in the playback-time information display area.

2. The information processing device according to claim 1, wherein the link means rewrites a file header area of the selected audio data upon linking.

3. The information processing device according to claim 2, wherein the link means rewrites a file header area of the selected item of still image data upon linking.

4. The information processing device according to claim 1, wherein the link means moves the selected item of still image data to a folder in which the selected audio data is stored, upon linking.

5. The information processing device according to claim 1, wherein said display means displays thumbnail images of the items of still image data which are linked with the selected audio data in the first image display area.

6. The information processing device according to claim 5, wherein said display means displays the thumbnail images of the items of still image data in the playback order from the top.

7. The information processing device according to claim 1, wherein said display means displays thumbnail images of the items of still image data which are not linked with any audio data in the second image display area.

8. A computer readable storage medium having an information processing program stored thereon that is executable by a computer to process audio data linked with still image data, wherein the program controls the computer to execute functions comprising:
   displaying, in a single window on a display screen: (i) a playback-time information display area for displaying, as a time line, playback-time positions of items of still image data linked with selected audio data, (ii) a first image display area for displaying all of the items of still image data linked with the selected audio data in a playback order of the items of still image data, and (iii) a second image display area for displaying still image data which is not linked with any audio data;
   detecting that an item of still image data is selected from among the still image data displayed in the second image display area;
   detecting an instruction to insert the selected item of still image data in one of the first image display area and the playback-time information display area; and
   linking the selected item of still image data to (i) a first playback-time position of the selected audio data when the selected item of still image data is inserted in the first image display area, and (ii) a second playback-time position of the selected audio data when the selected item of still image data is inserted in the playback-time information display area, wherein the first playback-time position is calculated from a position at which the selected item of still image data is inserted among the items of still image data in the first image display area, and the second playback-time position is specified with a pointer on the time line in the playback-time information display area when the selected item of still image data is inserted in the playback-time information display area.

* * * * *